United States Patent
Shen et al.

(10) Patent No.: US 8,223,692 B2
(45) Date of Patent: Jul. 17, 2012

(54) METHOD AND APPARATUS FOR DETERMINING A MOBILITY OF A MOBILE STATION IN A WIRELESS COMMUNICATION SYSTEM

(75) Inventors: Xiaohui Shen, Mundelin, IL (US); Sheng-Yu Hu, Beijing (CN); Hong-Lei Liu, Beijing (CN); Yinyan Wang, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 498 days.

(21) Appl. No.: 12/435,806

(22) Filed: May 5, 2009

(65) Prior Publication Data

US 2010/0267397 A1  Oct. 21, 2010

Related U.S. Application Data

(60) Provisional application No. 61/169,529, filed on Apr. 15, 2009.

(51) Int. Cl.
*H04W 4/00* (2009.01)
*H04W 24/00* (2009.01)
*H04M 3/42* (2006.01)

(52) U.S. Cl. .................. 370/328; 455/414.2; 455/432.1; 455/456.1

(58) Field of Classification Search .................. 370/328; 455/414.2, 432.1, 456.1
See application file for complete search history.

(56) References Cited

U.S. PATENT DOCUMENTS

2004/0180671 A1   9/2004  Spain, Jr.
2009/0310505 A1*  12/2009  Tsai et al. ..................... 370/252

FOREIGN PATENT DOCUMENTS

EP   1146756 A1   10/2001

* cited by examiner

*Primary Examiner* — Ronald Abelson (57) ABSTRACT

An infrastructure-based mobility determination module (MDM) receives multiple measurement reports from the MS and, for each received measurement report, stores values corresponding to values included in the report that are associated with measurements of parameters associated with received signals, wherein each stored value is stored in association with a wireless access node sourcing the corresponding signal. For each of one or more pairings of received measurement reports, the MDM then determines a signal parameter measurement change value corresponding to a change from the signal parameter measurement values associated with a first measurement report of the pairing to the signal parameter measurement values associated with a second measurement report of the pairing. Based on the one or more signal parameter measurement change values, the MDM determines an average signal parameter measurement change value and, based on the average signal parameter measurement change value, determines a mobility of the MS.

20 Claims, 5 Drawing Sheets

|  | NB1 | Rx1 | NB2 | Rx2 | NB3 | Rx3 | NB4 | Rx4 | NB5 | Rx5 | NB6 | Rx6 |
|---|---|---|---|---|---|---|---|---|---|---|---|---|
| T₁ |  |  | CID2 | 65 |  |  | CID1 | 40 | CID5 | 60 |  |  |
| T₂ |  |  |  |  | CID4 | 44 |  |  |  |  | CID5 | 60 |
| T₃ | CID1 | 70 |  |  | CID3 | 33 | CID5 | 34 |  |  |  |  |
| T₄ |  |  |  |  | CID4 | 40 |  |  | CID3 | 30 |  |  |
| T₅ |  |  | CID3 | 20 |  |  | CID2 | 50 |  |  |  |  |

|     | CID1 | CID2 | CID3 | CID4 | CID5 |
| --- | --- | --- | --- | --- | --- |
| $T_1$ | 40 | 65 | 0 | 0 | 60 |
| $T_2$ | 0 | 0 | 0 | 44 | 60 |
| $T_3$ | 70 | 0 | 33 | 0 | 34 |
| $T_4$ | 0 | 0 | 30 | 40 | 0 |
| $T_5$ | 0 | 50 | 20 | 0 | 0 |

METHOD AND APPARATUS FOR DETERMINING A MOBILITY OF A MOBILE STATION IN A WIRELESS COMMUNICATION SYSTEM

CROSS-REFERENCE OF RELATED APPLICATION

This application claims priority from provisional application Ser. No. 61/169,529, entitled "METHOD AND APPARATUS FOR DETERMINING A MOBILITY OF A MOBILE STATION IN A WIRELESS COMMUNICATION SYSTEM," and filed Apr. 15, 2009, which is commonly owned and incorporated herein by reference in its entirety.

FIELD OF THE INVENTION

The present invention relates generally to wireless communication systems and, in particular, to determining a mobility of a mobile station in a wireless communication system.

BACKGROUND OF THE INVENTION

Knowing whether a mobile station (MS) is moving or stationary can benefit network operators in many ways. For example, mobility information can help improve an accuracy of a location determination. For example, a continuously mobile MS may indicate that a subscriber is driving, and thus a location of the subscriber can be narrowed down to a nearby road if combined with a map. By way of another example, knowledge that an MS is mobile may be used to determine the kind of services to provide to the MS, such as which advertisements to push to the MS. In addition, statistics of subscribers' mobility information can help network operators better understand their network traffic distribution and thus allow the operators to better design and deploy their base stations, identify coverage holes, and minimize traffic loss.

One might think the problem of determining MS mobility can be solved by MS location information; if there is a change in a location of MS, for example, as measured by a Global Positioning Satellite (GPS) system, then the MS is moving, otherwise the MS is stationary. However, in reality, this is not a trivial determination. Location methods such as GPS can provide very accurate location information, but there are many limitations preventing network operators from benefiting from GPS enabled devices. First, it may take years for every mobile device to include a GPS device, especially for emerging markets. Second, GPS information is not available in an indoor environment. And third, operators may not be able to obtain GPS information from subscribers due to privacy issues. Other location methods, such as correlating received signal strength and distance from a receiver, are far from accurate. As a result, use of location-based methods for mobility determination is not a good choice for operators at this time.

Therefore, a need exists for an improved method and apparatus for determining mobility without changing the components of existing infrastructure or depending on enhanced MS capabilities.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for an improved method and apparatus for determining mobility without changing the components of existing infrastructure or depending on enhanced MS capabilities, a communication system is provided that includes an infrastructure-based mobililty determination module (MDM) that determines a mobility of a mobile station (MS). The MDM receives multiple measurement reports from the MS and, for each received measurement report, stores values corresponding to values included in the report that are associated with measurements of parameters associated with received signals, wherein each stored value is stored in association with a wireless access node sourcing the corresponding signal. For each of one or more pairings of received measurement reports, the MDM then determines a signal parameter measurement change value corresponding to a change from the signal parameter measurement values associated with a first measurement report of the pairing to the signal parameter measurement values associated with a second measurement report of the pairing. Based on the determined one or more signal parameter measurement change values, the MDM determines an average signal parameter measurement change value and, based on the average signal parameter measurement change value, determines a mobility of the MS.

Generally, an embodiment of the present invention encompasses a method for determining a mobility of a mobile station in a wireless communication system. The method includes receiving a plurality of measurement reports from an MS, wherein each measurement report of the plurality of the multiple measurement reports comprises one or more values associated with measurements of a parameter associated with a received signal and wherein each signal parameter measurement value is associated with a wireless access node sourcing the corresponding signal, and for each received measurement report, storing values corresponding to the received signal parameter measurement values, wherein each stored value is stored in association with the wireless access node sourcing the corresponding signal. The method further includes, for each of one or more pairings of measurement reports of the plurality of measurement reports, determining a signal parameter measurement change value corresponding to change from signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report, determining an average signal parameter measurement change value based on the signal parameter measurement change value determined for each of the one or more pairings of measurement reports, and determining a mobility of the MS based on the average signal parameter measurement change value.

Another embodiment of the present invention encompasses a mobility determination module that determines a mobility of an MS in a wireless communication system. The mobility determination module includes at least one memory device and a processor associated with the at least one memory device. The processor is configured to receive a plurality of measurement reports from the MS, wherein each measurement report of the plurality of measurement reports comprises one or more values associated with measurements of a parameter associated with a received signal values and wherein each signal parameter measurement value is associated with a wireless access node sourcing the corresponding signal, and for each received measurement report, store values corresponding to the received signal parameter measurement values in the at least one memory device, wherein each stored value is stored in association with the wireless access node sourcing the corresponding signal. The processor is further configured to, for each of one or more pairings of measurement reports of the plurality of measurement reports, determine a signal parameter measurement change value corresponding to change from the signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report, determine an average signal parameter measurement change value based on the signal parameter measurement change value determined for each of the one or more pairings of measurement reports, and determine a mobility of the mobile station based on the average signal parameter measurement change value.

Figure 1:
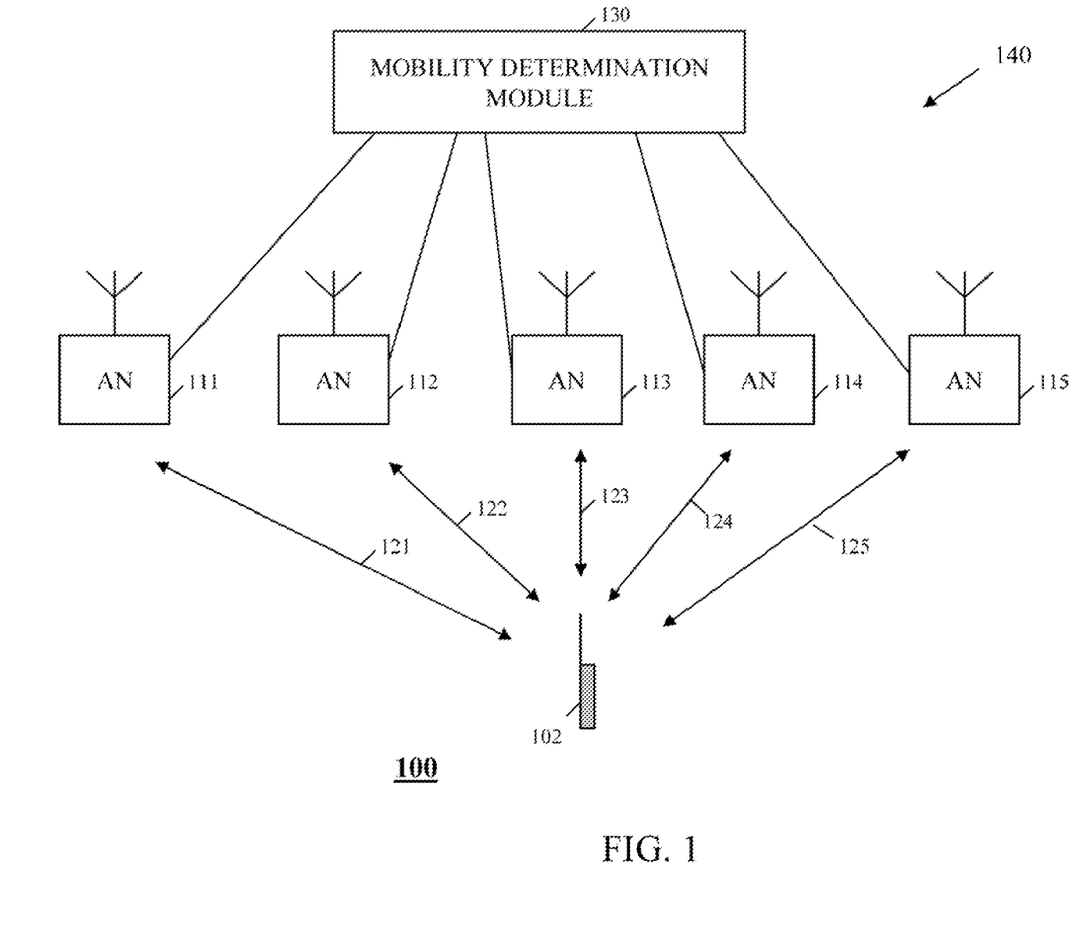
FIG. 1 is a block diagram of a wireless communication system in accordance with an embodiment of the present invention.

The present invention may be more fully described with reference to FIGS. 1-7. FIG. 1 is a block diagram of a wireless communication system 100 in accordance with an embodiment of the present invention. Communication system 100 includes a mobile station (MS) 102, such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a Radio Access Network (RAN) 140 that provides wireless communication services to MS 102. RAN 140 includes multiple network-based wireless access nodes (ANs) 111-115 (five shown), such as a Base Transceiver Station (BTS), a Node B, or an Access Point, that are each in communication with an infrastructure-based mobililty determination module (MDM) 130. In various embodiments of the present invention, MDM 130 may be implemented in one or more of: a radio access network controller, such as a Base Station Controller (BSC) or a Radio Network Controller (RNC), a mobile switching center (MSC), one or more of ANs 111-115, a Serving Mobile Location Center (SMLC), or any other network element that may be communicated with by the ANs.

Each AN 111-115 provides communications services to mobile stations located in a coverage area, such as a cell or a sector of a cell, serviced by the AN via a respective air interface 121-125. Each air interface 121-125 comprises a forward link and a reverse link that each includes multiple communication channels. Preferably, each forward link includes a paging channel, multiple forward link control channels, and multiple forward link traffic channels. Preferably, each reverse link includes a reverse link access channel, multiple reverse link control channels, and multiple reverse link traffic channels.

Figure 2:
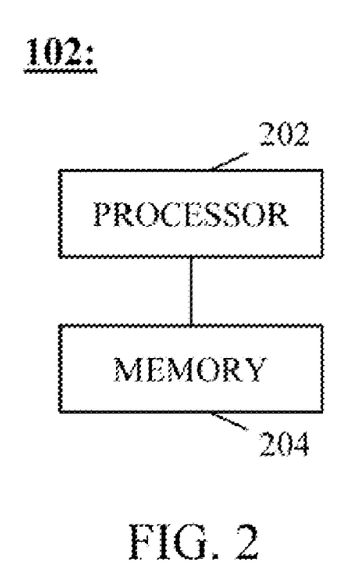
FIG. 2 is a block diagram of a mobile station of the communication system of FIG. 1 in accordance with an embodiment of the present invention.
Figure 3:
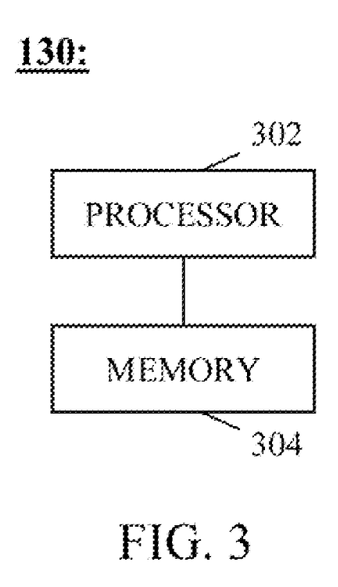
FIG. 3 is a block diagram of a mobility determination module of the communication system of FIG. 1 in accordance with an embodiment of the present invention.

Referring now to FIGS. 2 and 3, each of MS 102 and MDM 130 includes a respective processor 202, 302, such as one or more microprocessors, microcontrollers, digital signal processors (DSPs), combinations thereof or such other devices known to those having ordinary skill in the art. Each of MS 102 and MDM 130 further includes a respective one or more memory devices 204, 304 associated with the respective processor, such as random access memory (RAM), dynamic random access memory (DRAM), and/or read only memory (ROM) or equivalents thereof, that store data and programs that may be executed by the respective processor and allow the processor to operate in communication system 100.

Figure 4:
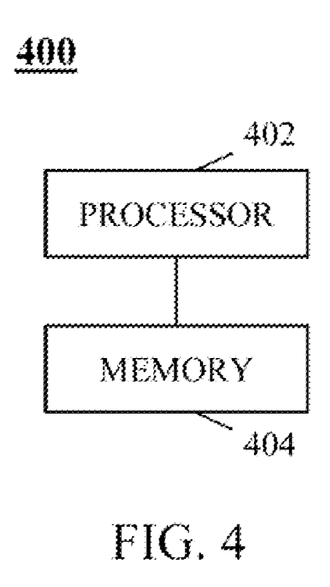
FIG. 4 is a block diagram of a wireless access node of the communication system of FIG. 1 in accordance with an embodiment of the present invention.

FIG. 4 is a block diagram of an AN 400, such as ANs 111-115, in accordance with an embodiment of the present invention. AN 400 includes a processor 402, such as one or more microprocessors, microcontrollers, digital signal processors (DSPs), combinations thereof or such other devices known to those having ordinary skill in the art. AN 400 further includes one or more memory devices 404 associated with the processor, such as random access memory (RAM), dynamic random access memory (DRAM), and/or read only memory (ROM) or equivalents thereof, that store data and programs that may be executed by the respective processor and allow the processor to operate in communication system 100.

The embodiments of the present invention preferably are implemented within MDM 130, and more particularly with or in software programs and instructions stored in the respective at least one memory device 304, and executed by the processor 302, of the MDM. However, one of ordinary skill in the art realizes that the embodiments of the present invention alternatively may be implemented in hardware, for example, integrated circuits (ICs), application specific integrated circuits (ASICs), and the like, such as ASICs implemented in MDM 130. Based on the present disclosure, one skilled in the art will be readily capable of producing and implementing such software and/or hardware without undo experimentation.

Preferably, communication system 100 is a Global System for Mobile communications (GSM) communication system, or a later generation GSM system, that operates in accordance with the GSM, or later generation GSM such as 3GPP (Third Generation Partnership Project), standards, which specify wireless telecommunications system operating protocols, including radio system parameters and call processing procedures. However, those who are of ordinary skill in the art realize that communication system 100 may operate in accordance with any wireless telecommunication system, such as but not limited to a Code Division Multiple Access (CDMA) communication system or later generation CDMA communication system, a Time Division Multiple Access (TDMA) communication system, a Frequency Division Multiple Access (FDMA) communication system, or an Orthogonal Frequency Division Multiple Access (OFDM) communication system, such as a Worldwide Interoperability for Microwave Access (WiMAX) communication system that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

In order to provide location-based services and to implement improved system planning, communication system 100 determines a mobility of an MS based on signal strength measurements reported by the MS in association with multiple access nodes and over multiple reporting periods. Further, the communication system 100 determines a mobility of an MS based on the reported signal strength measurements without a need to determine a correlation between a reported signal strength measurement and a distance of the MS from a corresponding access node transmitting the measured signal.

Figure 5:
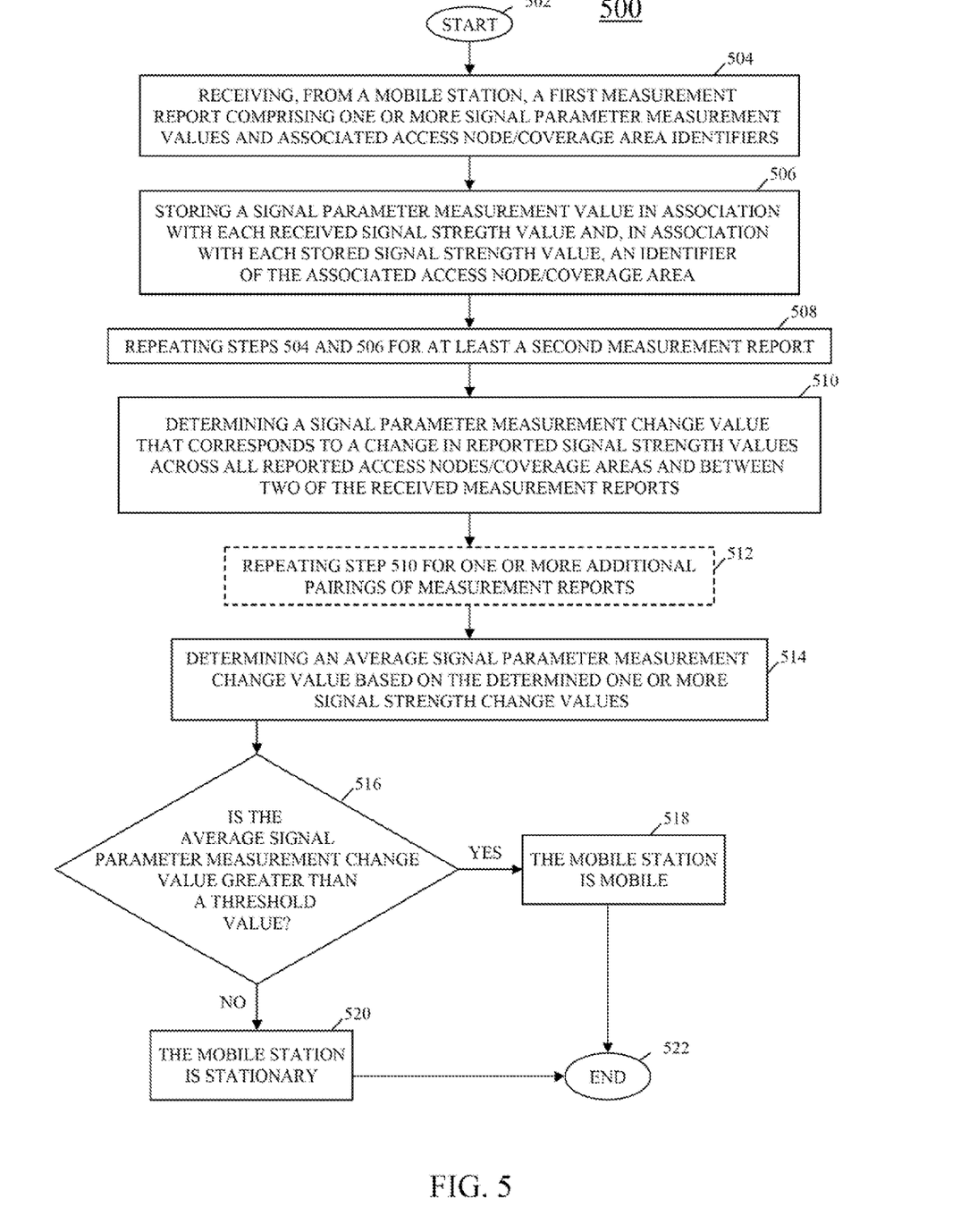
FIG. 5 is a logic flow diagram of a method by which the communication system of FIG. 1 determines a mobility of a mobile station in accordance with an embodiment of the present invention.

Referring now to FIG. 5, a logic flow diagram 500 is provided that illustrates a method by which communication system 100, and in particular MDM 130, determines a mobility of an MS, such as MS 102, in accordance with an embodiment of the present invention. Logic flow diagram 500 begins (502) when, during a first reporting period, the MS, that is, MS 102, measures a parameter associated with a signal received from each of one or more ANs in a neighbor list of the MS, such as ANs 111-115. For example, the measured parameter may comprise a received signal quality such as a signal strength (for example, an RSSI (Received Signal Strength Indicator)), a CINR (Carrier to Interference+Noise Ratio), an SNR (Signal to Noise Ratio), or a parameter such as an RTT (Round Trip Time), and RTD (Round Trip Time Delay), or a TOA (Time of Arrival). MS 102 then conveys to MDM 130, and the MDM receives (504) from the MS via a serving AN, such as AN 113, a first measurement report. The first measurement report includes a value corresponding to the signal parameter measurement, or an indicator value corresponding to the signal parameter measurement, for each of the one or more measured ANs. The measurement report further identifies, in association with each reported signal parameter measurement, an AN or a coverage area sourcing the measured signal. That is, in association with each reported signal parameter measurement, the MS also reports an identifier of the AN that transmitted the measured signal or the coverage area associated with the transmitting AN. For example, MS 12 may include in the report and in association with each signal parameter measurement, a base station identifier or a cell identifier (CID).

Preferably, the MS measures the parameter associated with the received signal when the MS is engaged in a call. For example, under the GSM standards, an MS typically conveys a measurement report (MR) to a serving AN approximately every 480 milliseconds (ms) when engaged in a call, and thus a call typically generates multiple MRs. However, any kind of reporting that indicates a measured parameter associated with a received signal, such as a Channel Quality Information (CQI) message used by 3GPP E-UTRA (Evolutionary UMTS Terrestrial Radio Access) systems, may be used herein without departing from the spirit and scope of the present invention.

For example, the first measurement report may include multiple pairs of data fields. In a first data field of each pair of data fields, MS 102 may include an identifier of the AN and/or coverage area. In a second data field of each pair of data fields, the MS may include a value corresponding to a measured parameter associated with a received signal that was transmitted by the AN/coverage area identified in the first data field of the pair of data fields.

In response to receiving (504) the first measurement report, MDM 130 stores (506) a value associated with each received signal parameter measurement included in the first measurement report. The signal parameter measurement value(s) stored in association with each received measurement report may or may not be the same as the signal parameter measurement values included the received in the received measurement report. For example, as indicated below with respect to FIG. 6, each stored signal parameter measurement value(s), such as a signal strength value, may be an output of a formula whose input is a signal strength value included in the received measurement report. MDM 130 further stores, in association with each stored signal parameter measurement value, an identifier of the corresponding AN or AN's coverage area. Preferably, MDM 130 stores the signal parameter measurement values and AN/coverage area identifiers in a table maintained in the at least one memory device 304 of the MDM. MS 102 and MDM 130 then repeat (508) steps 504 and 506 for a second reporting period/measurement report (for purposes of clarity, a reporting period and/or measurement report may be collectively referred to herein as a "measurement report"), a third measurement report, a fourth measurement report, and so on, until a desired number of measurement reports are received.

Figure 6:
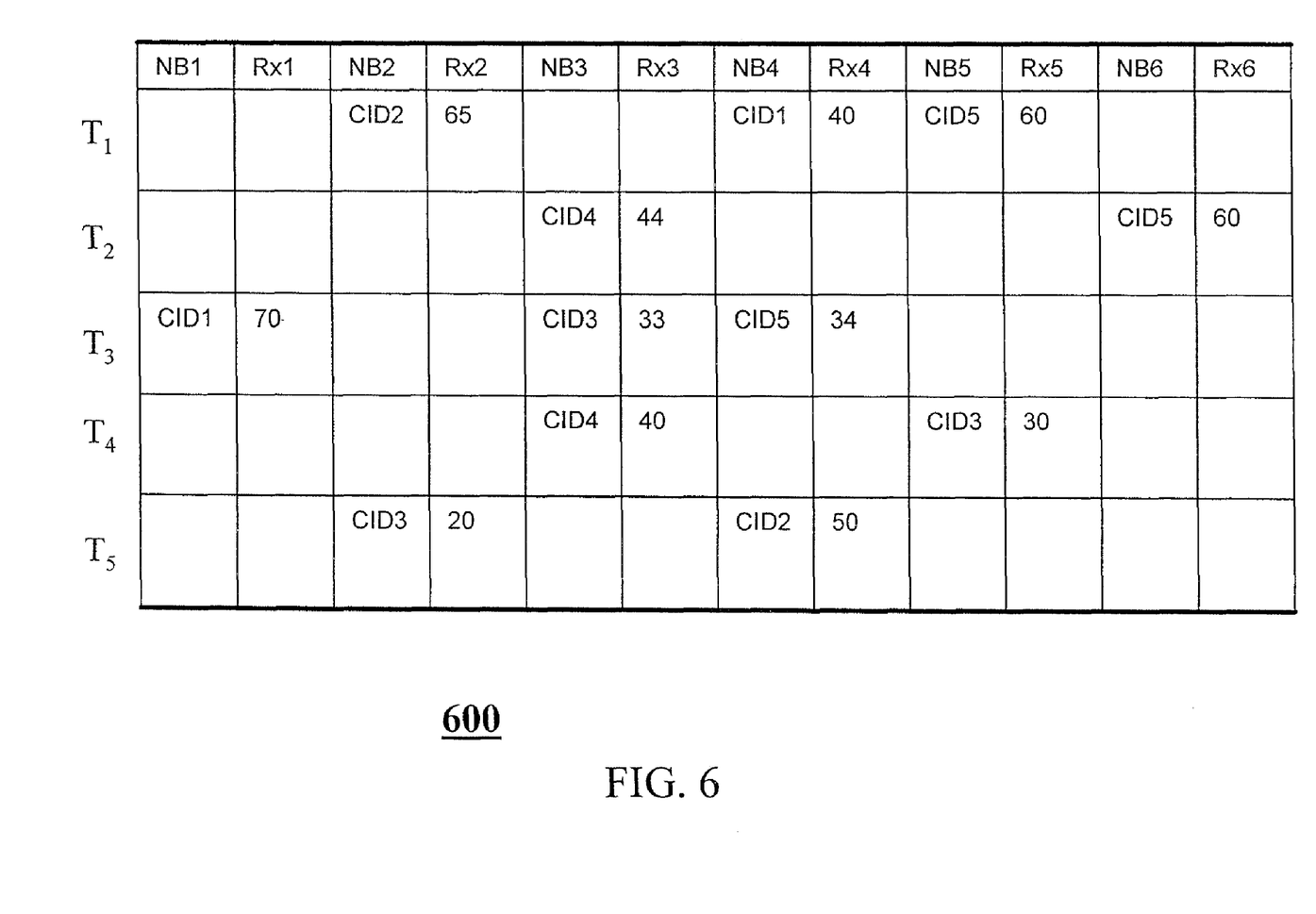
FIG. 6 is an exemplary table for storing signal strength values associated with multiple received measurement reports in accordance with an embodiment of the present invention.

Referring now to FIG. 6, an exemplary table 600 is depicted for storing signal parameter measurement values, and in particular signal strength values, associated with multiple received measurement reports in accordance with an embodiment of the present invention. Each row 621-625 of table 600 corresponds to a received measurement report. For example, table 600 comprises five rows, each row corresponding to one of five measurement reports, that is, $T_1$, $T_2$, $T_3$, $T_4$, and $T_5$. Each odd column of table 600, that is, NB1, NB2, NB3, NB4, NB5, and NB6, stores identifiers of ANs/coverage areas. Each even column of table 600, that is, Rx1, Rx2, Rx3, Rx4, Rx5, and Rx6, stores signal strength values associated with the corresponding ANs/coverage area identifier in the odd column immediately to the left.

For example, as indicated by table 600, in a first measurement report $T_1$, MS 102 reported signal strengths for three ANs/coverage areas, that is, CID2 (cell identifier 2) corresponding to a second AN of the multiple ANs 111-115, for example, AN 112, CID1 corresponding to a first AN of the multiple ANs, for example, AN 111, and CID5 corresponding to a fifth AN of the multiple ANs, for example, AN 115. A signal strength value of 65 is stored in association with CID2 (that is, in table 600, the stored value being a reported signal power value, in dBm, plus 110 for ease of calculation), a signal strength value of 40 is stored in association with CID1, and a signal strength value of 60 is stored in association with CID5.

In a second measurement report $T_2$, MS 102 reported signal strengths for two ANs/coverage areas, that is, CID4 corresponding to a fourth AN of the multiple ANs 111-115, for example, AN 114, and CID5. A signal strength value of 44 is stored in association with CID4 and a signal strength value of 60 is stored in association with CID5.

In a third measurement report $T_3$, MS 102 reported signal strengths for three ANs/coverage areas, that is, CID1, CID3 corresponding to a third AN of the multiple ANs 111-115, for example, AN 113, and CID5. A signal strength value of 70 is stored in association with CID1, a signal strength value of 33 is stored in association with CID3, and a signal strength value of 34 is stored in association with CID5.

In a fourth measurement report $T_4$, MS 102 reported signal strengths for two ANs/coverage areas, that is, CID4 and CID3. A signal strength value of 40 is stored in association with CID4 and a signal strength value of 30 is stored in association with CID5. And in a fifth measurement report $T_5$, MS 102 reported signal strengths for two ANs/coverage areas, that is, CID3 and CID2. A signal strength value of 20 is stored in association with CID3 and a signal strength value of 50 is stored in association with CID2.

Referring again to FIG. 5, based on the stored signal parameter measurement values, MDM 130 then determines (510) a 'signal parameter measurement change value,' for example, a signal strength change value, that corresponds to a change in reported signal parameter measurement values for example, a change in reported signal strength values, across all reported ANs/coverage areas and between two measurement reports, that is, that corresponds to a change from the signal parameter measurement values associated with a first measurement report of a pairing of measurement reports to the signal parameter measurement values associated with a second measurement report of the same pairing of measurement reports. The two measurement reports are within a first predetermined period of time of each other, and preferably are from consecutive reporting periods. Step 510 then may be repeated (512) for as many pairings of other measurement reports as is desired by a designer of communication system 100, which first measurement report, second measurement report, and other measurement reports preferably are within a second predetermined period of time of each other, which second predetermined period of time may or may not be the same as the first predetermined period of time, as the number of signal parameter measurement change values (one can suffice) utilized to determine an MS's mobility is up to the designer of the communication system and is not critical to the present invention.

Figure 7:
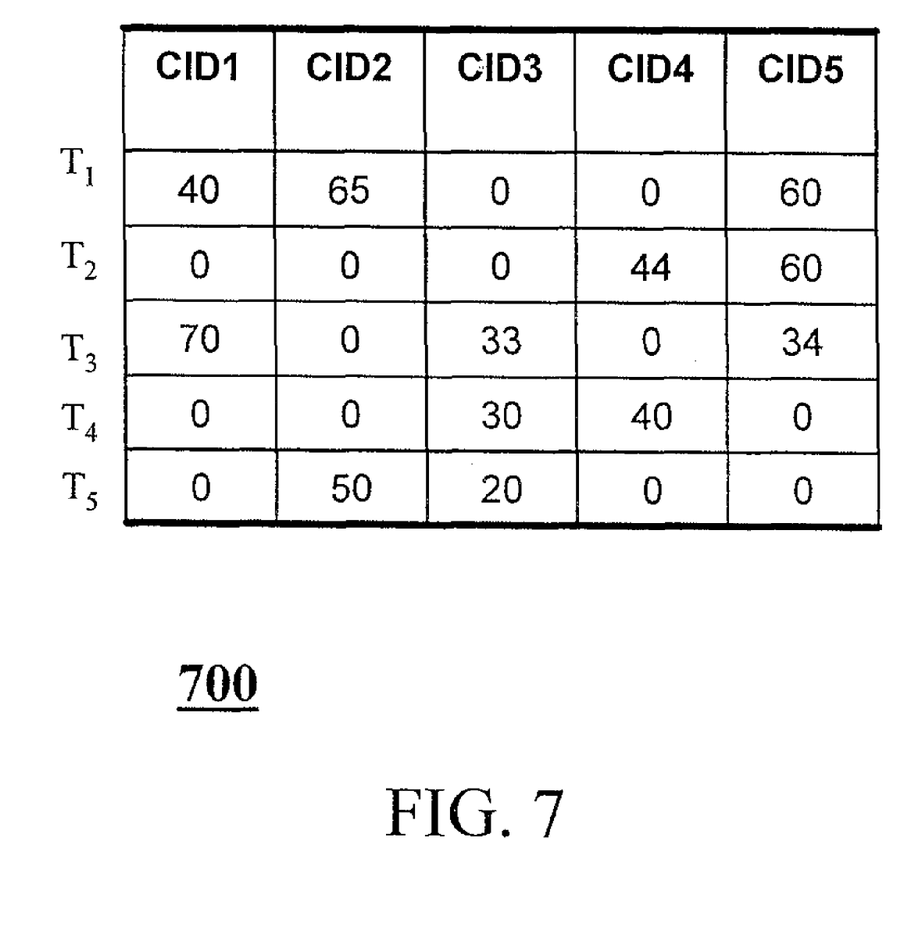
FIG. 7 is an exemplary table for reformatting and storing the signal strength values of the table of FIG. 6 in accordance with an embodiment of the present invention.

For example and referring now to FIG. 7, an exemplary table 700 is depicted that may be useful for determining a signal parameter measurement change value, and in particular a signal strength change value, based on the values in table 600 and in accordance with an embodiment of the present invention. Table 700 may be referred to herein as a second table, as opposed to first table 600, and includes the data stored in table 600 but in a reformatted form. Table 700 is maintained by at least one memory device 304 of MDM 130. Each column of table 700 corresponds to an AN/coverage area for which MS 102 reported a signal strength measurement during one or more of the reporting periods, that is, CID1-CID5, and each row of table 700 again corresponds to a reporting period/measurement report, that is, $T_1$-$T_5$. Thus, the value in each cell of table 700 is a signal strength value associated with a given AN/coverage area for a particular reporting period/measurement report. When no value has been reported for an AN/coverage area in a particular reporting period/measurement report, then a zero (0) is inserted in the corresponding cell.

For example, as depicted in table 700, a first column of the table depicts signal strength values reported for the first AN/coverage area CID1. The column includes the values 40, 0, 70, 0, and 0, which correspond to reporting periods $T_1$, $T_2$, $T_3$, $T_4$, and $T_5$, respectively. Similarly, a second column of table 700 depicts signal strength values reported for the second AN/coverage area CID2, and includes the values 65, 0, 0, 0, and 50, which respectively correspond to reporting periods $T_1$-$T_5$. A third column of table 700 depicts signal strength values reported for the third AN/coverage area CID3, and includes the values 0, 0, 33, 30, and 20, which respectively correspond to reporting periods $T_1$-$T_5$. A fourth column of table 700 depicts signal strength values reported for the fourth AN/coverage area CID4 and includes the values 0, 44, 0, 40, and 0, which respectively correspond to reporting periods $T_1$-$T_5$. And a fifth column of table 700 depicts signal strength values reported for the fifth AN/coverage area CID5 and includes the values 60, 60, 34, 0, and 0, which respectively correspond to reporting periods $T_1$-$T_5$.

Preferably, the signal strength change value is a Euclidean distance, and MDM 130 determines a signal strength change value associated with a pairing of two measurement reports by calculating a Euclidean distance between the signal strength values stored for each of the two measurement reports. For example and with reference to table 700, a Euclidean distance between the signal strength values stored for the ANs/coverage areas in association with reporting period/measurement report $T_1$ and the signal strength values stored for the ANs/coverage areas in association with reporting period/measurement report $T_2$, that is, $d(T_1-T_2)$, may be determined as follows, $$d(T_1-T_2)=[(40-0)^2+(65-0)^2+(0-0)^2+(0-44)^2+(60-60)^2]^{1/2}=88.$$

Similarly, a Euclidean distance between the signal strength values stored for the ANs/coverage areas in association with reporting period/measurement report $T_2$ and the signal strength values stored for the ANs/coverage areas in association with reporting period/measurement report $T_3$, that is, $d(T_2-T_3)$, may be determined as follows, $$d(T_2-T_3)=[(0-70)^2+(0-0)^2+(0-33)^2+(44-0)^2+(60-34)^2]^{1/2}=92.$$

Similarly again, Euclidean distances may be determined for a change in signal strength values between reporting periods $T_3$ $_{and}$ $_{T4}$, that is, $d(T_3-T_4)$, and between reporting periods/measurement reports $T_4$ $_{and}$ $_{T5}$, that is, $d(T_4-T_5)$.

Based on the signal parameter measurement change values determined with respect to one or more pairings of reporting periods/measurement reports, MDM 130 then determines (514) an average signal parameter measurement change value, that is, an average Euclidean distance. If only one signal strength parameter measurement value is determined, then that value would be the average signal parameter measurement change value. For example, MDM 130 may determine the average Euclidean distance for the above four pairings of reporting periods/measurement reports $T_1$-$T_5$, that is, $T_1/T_2$, $T_2/T_3$, $T_3/T_4$, and $T_4/T_5$, as follows, $$\text{Average Euclidean Distance} = [d(T_1 - T_2) + d(T_2 - T_3) + d(T_3 - T_4) + d(T_4 - T_5)]/4$$
$$= (88 + 92 + 87 + 64)/4$$
$$= 82.75.$$

Thus, if 'n' measurement reports have been received, corresponding to 'n' reporting periods, then 'n−1' distances of consecutive reporting periods may be calculated and then averaged. The average Euclidean distance, also referred to herein as an Average Neighbor Distance (AND), provides a robust measure of all changes in the reported signal parameter measurements across all measurement reports.

Referring again to FIG. 5, based on the determined average signal parameter measurement change value, MDM 130 then determines (516, 518, 520) a mobility of MS 102 and logic flow 500 then ends (522). For example, MDM 130 may compare (516) the average signal parameter measurement change value, for example, AND, to a threshold value maintained in at least one memory device 304 to produce a comparison. If the average signal parameter measurement change value, that is, AND, is larger than the threshold value, then MDM 130 determines (518) that MS 102 is mobile. And if the average signal parameter measurement change value, that is, AND, is less than the threshold value, then MDM 130 determines (520) that MS 102 is stationary. The threshold value may be empirically determined by an operator of communication system 100, based on experience in the field or based on field testing. For example, empirical testing on over 4000 calls has shown that approximately 95% of call involving a mobile MS have an AND value over 18 (again, merely for ease of calculation, where the AND value is based on received signal strength values corresponding to a reported received signal power, in dBm, plus 110) and approximately 95% of calls involving a stationary MS have an AND value under 18.

By looking for an overall change in reported signal parameter measurements between measurement reports, as opposed to looking at a change in reported signal parameter measurements for an individual access node, communication system 100 is able to make a mobility determination that is less likely to be false due to a change in channel conditions that predominantly impacts only one or two particular access nodes. Furthermore, by determining a mobility of an MS based on an average overall signal parameter measurement change that represents signal parameter measurement changes among multiple pairings of measurement reports, the accuracy of the mobility determination is enhanced as temporary changes in channel conditions, for example, when an MS passes behind a building, are compensated for. Thus communication system provides a robust and improved infrastructure-based mobility determination that does not require determining a specific location of an MS and that may be implemented in a communication system infrastructure without the need to add new hardware to the infrastructure.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for determining a mobility of a mobile station in a wireless communication system, the method comprising:
   receiving a plurality of measurement reports from a mobile station, wherein each measurement report of the plurality of the multiple measurement reports comprises one or more values associated with measurements of a parameter associated with a received signal and wherein each signal parameter measurement value is associated with a wireless access node sourcing the corresponding signal;
   for each received measurement report, storing values corresponding to the received signal parameter measurement values, wherein each stored value is stored in association with the wireless access node sourcing the corresponding signal;
   for each of one or more pairings of measurement reports of the plurality of measurement reports, determining a signal parameter measurement change value corresponding to change from signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report and wherein determining a signal parameter measurement change value for a pairing of measurement reports comprises determining a Euclidean distance between the signal parameter measurement values stored in association with a first measurement report of the pairing of measurement reports and the signal parameter measurement values stored in association with a second measurement report of the pairing of measurement reports;
   determining an average signal parameter measurement change value based on the signal parameter measurement change value determined for each of the one or more pairings of measurement reports; and
   determining a mobility of the mobile station based on the average signal parameter measurement change value.

2. The method of claim 1, wherein determining a mobility of the mobile station based on the average signal parameter measurement change value comprises:
   comparing the average signal strength change value to a threshold to produce a comparison; and
   determining whether the mobile station is mobile or stationary based on the comparison.

3. The method of claim 1, wherein storing values corresponding to the received signal parameter measurement values comprises storing values corresponding to the received signal parameter measurement values in a table, wherein each stored value is stored in association with one or more of an access node and a coverage area.

4. The method of claim 3, wherein the table is a first table and wherein storing values corresponding to the received signal parameter measurement values comprises storing the values in a second table in a reformatted form.

5. The method of claim 1, wherein determining an average signal parameter measurement change value comprises determining an average Euclidean distance.

6. The method of claim 5, wherein determining a mobility of the mobile station based on the average signal parameter measurement change value comprises:

comparing the average Euclidean distance to a threshold to produce a comparison; and determining whether the mobile station is mobile or stationary based on the comparison.

7. An access node that implements the method of claim 1.

8. An access network controller that implements the method of claim 1.

9. A mobility determination module that determines a mobility of a mobile station, the mobility determination module comprising:

at least one memory device; and a processor associated with the at least one memory device that is configured to:

receive a plurality of measurement reports from the mobile station, wherein each measurement report of the plurality of measurement reports comprises one or more values associated with measurements of a parameter associated with a received signal values and wherein each signal parameter measurement value is associated with a wireless access node sourcing the corresponding signal;

for each received measurement report, store values corresponding to the received signal parameter measurement values in the at least one memory device, wherein each stored value is stored in association with the wireless access node sourcing the corresponding signal;

for each of one or more pairings of measurement reports of the plurality of measurement reports, determine a signal parameter measurement change value corresponding to change from the signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report and wherein determining a signal parameter measurement change value for a pairing of measurement reports comprises determining a Euclidean distance between the signal parameter measurement values stored in association with a first measurement report of the pairing of measurement reports and the signal parameter measurement values stored in association with a second measurement report of the pairing of measurement reports;

determine an average signal parameter measurement change value based on the signal parameter measurement change value determined for each of the one or more pairings of measurement reports; and determine a mobility of the mobile station based on the average signal parameter measurement change value.

10. The mobility determination module of claim 9, wherein the processor is configured to determine a mobility of the mobile station based on the average signal parameter measurement change value by comparing the average signal parameter measurement change value to a threshold to produce a comparison and determining whether the mobile station is mobile or stationary based on the comparison.

11. The mobility determination module of claim 9, wherein the processor is configured to store values corresponding to the received signal parameter measurement values by storing values corresponding to the received signal parameter measurement values in a table, wherein each stored value is stored in association with one or more of an access node and a coverage area.

12. The mobility determination module of claim 11, wherein the table is a first table and wherein the processor is configured to store values corresponding to the received signal parameter measurement values by storing the values in a second table in a reformatted form.

13. The mobility determination module of claim 9, wherein the processor is configured to determine an average signal parameter measurement change value by determining an average Euclidean distance.

14. The mobility determination module of claim 13, wherein the processor is configured to determine a mobility of the mobile station based on the average signal parameter measurement change value by comparing the average Euclidean distance to a threshold to produce a comparison and determining whether the mobile station is mobile or stationary based on the comparison.

15. An access node comprising the mobility determination module of claim 9.

16. An access network controller comprising the mobility determination module of claim 9.

17. A method for determining a mobility of a mobile station in a wireless communication system, the method comprising:

receiving a plurality of measurement reports from a mobile station, wherein each measurement report of the plurality of the multiple measurement reports comprises one or more values associated with measurements of a parameter associated with a received signal and wherein each signal parameter measurement value is associated with a wireless access node sourcing the corresponding signal;

for each received measurement report, storing values corresponding to the received signal parameter measurement values, wherein each stored value is stored in association with the wireless access node sourcing the corresponding signal;

for each of one or more pairings of measurement reports of the plurality of measurement reports, determining a signal parameter measurement change value corresponding to change from signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report;

determining an average signal parameter measurement change value based on the signal parameter measurement change value determined for each of the one or more pairings of measurement reports; and determining a mobility of the mobile station based on the average signal parameter measurement change value and wherein determining the mobility of the mobile station comprises comparing the average signal strength change value to a threshold to produce a comparison and determining whether the mobile station is mobile or stationary based on the comparison.

18. The method of claim 17, wherein determining a signal parameter measurement change value for a pairing of measurement reports comprises determining a Euclidean distance between the signal parameter measurement values stored in association with a first measurement report of the pairing of measurement reports and the signal parameter measurement values stored in association with a second measurement report of the pairing of measurement reports.

19. A mobility determination module that determines a mobility of a mobile station, the mobility determination module comprising:
at least one memory device; and
a processor associated with the at least one memory device that is configured to:
receive a plurality of measurement reports from the mobile station, wherein each measurement report of the plurality of measurement reports comprises one or more values associated with measurements of a parameter associated with a received signal values and wherein each signal parameter measurement value is associated with a wireless access node sourcing the corresponding signal;
for each received measurement report, store values corresponding to the received signal parameter measurement values in the at least one memory device, wherein each stored value is stored in association with the wireless access node sourcing the corresponding signal;
for each of one or more pairings of measurement reports of the plurality of measurement reports, determine a signal parameter measurement change value corresponding to change from the signal parameter measurements associated with a first measurement report of the pairing of measurement reports to the signal parameter measurements associated of a second measurement report of the pairing of measurement reports based on the signal parameter measurement values stored in association with the first measurement report and the signal parameter measurement values stored in association with the second measurement report;
determine an average signal parameter measurement change value based on the signal parameter measurement change value determined for each of the one or more pairings of measurement reports; and
determine a mobility of the mobile station based on the average signal parameter measurement change value wherein determining the mobility of the mobile station by comparing the average signal parameter measurement change value to a threshold to produce a comparison and determining whether the mobile station is mobile or stationary based on the comparison.

20. The mobility determination module of claim 13, wherein the processor is configured to determine a mobility of the mobile station based on the average signal parameter measurement change value by comparing the average Euclidean distance to a threshold to produce a comparison and determining whether the mobile station is mobile or stationary based on the comparison.

* * * * *